United States Patent [19]

Khare

[11] Patent Number: 4,601,322

[45] Date of Patent: Jul. 22, 1986

[54] WELD FORMING OF PIPE MOLDS

[75] Inventor: Ashok K. Khare, Warren, Pa.

[73] Assignee: National Forge Company, Irvine, Pa.

[21] Appl. No.: 586,751

[22] Filed: Mar. 13, 1984

[51] Int. Cl.[4] .............................................. B22C 13/08
[52] U.S. Cl. ................................... 164/286; 164/418;
   29/527.6; 29/527.1; 29/DIG. 26
[58] Field of Search ............... 164/286, 418; 219/76.1,
   219/76.12, 76.14; 228/176; 76/107 R, 107 S;
   249/135, 137; 29/151 R, 418, 527.1, 527.5,
   527.6, DIG. 31, DIG. 26

[56] References Cited

U.S. PATENT DOCUMENTS

| | | | |
|---|---|---|---|
| 1,193,667 | 8/1916 | Corey | 219/76.1 |
| 1,217,633 | 2/1917 | Putnam | 219/76.1 |
| 1,498,138 | 6/1924 | Wilder | 164/298 |
| 1,527,338 | 2/1925 | Wilder | 164/348 |
| 1,623,146 | 4/1927 | Wilder | 164/384 |
| 1,746,373 | 2/1930 | Uhrig | 249/135 |
| 2,106,590 | 1/1938 | Boegehold et al. | 29/527.6 |
| 2,147,350 | 2/1939 | Pohl | 22/65 |
| 2,300,034 | 10/1942 | McWane | 22/136 |
| 3,266,107 | 8/1966 | Groteke | 22/192 |
| 3,358,359 | 12/1967 | Gortzen | 29/529 |
| 3,414,488 | 12/1968 | Willingham | 204/37 |
| 3,771,755 | 11/1973 | Oehler et al. | 164/286 |
| 4,171,560 | 10/1979 | Garrett | 228/176 |
| 4,215,809 | 8/1980 | Davis | 228/48 |
| 4,242,981 | 1/1981 | Bernard et al. | 219/76.1 |

FOREIGN PATENT DOCUMENTS

| | | |
|---|---|---|
| 0049899A1 | 4/1982 | European Pat. Off. . |
| 2939538A1 | 4/1980 | Fed. Rep. of Germany . |
| 72761 | 5/1982 | Japan .............................. 164/286 |
| 543924 | 11/1973 | Switzerland . |
| 2061156A | 5/1981 | United Kingdom . |

OTHER PUBLICATIONS

Irving, Robert, "Shape Welding: A New Concept in Fabrication," *Iron Age*, Nov. 23, 1981, p. 111.
Kussmaul, K., F. W. Schoch and H. Luckow, "High Quality Large Components 'Shape Welded' by a SAW Process," *Welding Journal*, Sep. 1983, p. 17.
*Metals Handbook*, vol. 6, "Welding, Brazing, and Soldering", pp. 809-812, American Society for Metals, Metals Park, Ohio 44073 (9th Edition, 1983).

*Primary Examiner*—Francis S. Husar
*Assistant Examiner*—Jorji M. Griffin
*Attorney, Agent, or Firm*—Wayne M. Kennard

[57] ABSTRACT

A pipe mold for centrifugally casting pipe is disclosed. The pipe mold according to the present invention is made by depositing weld material on a rigid shell. The rigid shell is obtained by forming a flat plate into a cylinder and welding the resultant seam. Additional rigid shells can be circumferentially welded together to obtain a desired length. The welded seams are areas of weakness called metallurgical notches. To eliminate the metallurgical notches, weld material is deposited on the shell. In one embodiment, weld material is deposited on the outside of the shell. The shell then is machined away. The resultant pipe mold has a total wall thickness comprising weld material and is free of metallurgical notches. In addition, the need for furnace heat-treatment to achieve properties in the weld material can be eliminated.

40 Claims, 4 Drawing Figures

4,601,322

WELD FORMING OF PIPE MOLDS

TECHNICAL FIELD OF INVENTION

This invention relates to pipe molds for centrifugal casting machines. More particularly, this invention relates to pipe molds wherein the total or partial pipe wall thickness comprises weld material.

BACKGROUND OF THE INVENTION

A pipe mold is a long hollow cylindrical object with a bell and spigot end. Pipe molds are used in machines which centrifugally cast pipe. In centrifugal casting machines, the pipe mold is rotated on rollers at a high rate of speed while a stream of molten metal is introduced therein to form pipe.

Pipe manufactured by centrifugally casting are generally made from cast iron or ductile iron. These pipe are used, for example, in the ground for transporting water or natural gas. The pipe molds for making such pipe vary in size, having diameters ranging between 2 to 80 inches (50 to 2000 mm.) and lengths of up to about 30 feet (9 meters).

Pipe molds are often manufactured by forging. The larger pipe mold sizes are beyond the forging size capabilities of most forging suppliers. Where large forging equipment is available, the manufacturing costs are commercially prohibitive. In addition, there is a need to heat-treat the forged pipe mold in a furnace to achieve the desired mechanical and physical properties, such as hardness. In some grades of steel, however, only a low depth of hardening is possible by heat-treatment.

The size limitations of forging can be alleviated by manufacturing pipe molds by forming a flat rolled plate into a cylindrical form and welding the resulting seam or joint in the longitudinal or helical direction. When long pipe molds are desired, several tubes can be butt-welded together circumferentially at their ends to make a pipe mold of a desired length.

One disadvantage in using a welded form, however, is that each welded joint creates an area of weakness in the mold called a "metallurgical notch." The weakness of the metallurgical notch is due to (1) grain mismatch between the plate and the weld and (2) grain coarsening in the "heat affected zone" near the weld which occurs due to the heat of welding. In addition, hoop stresses caused by the constantly changing hot and cold temperatures during the casting process tend to cause the metallurgical notches to open up.

Therefore, during service, the pipe mold is prone to fail or crack along the metallurgical notches. The molten iron used in making the pipe may seep into the cracks in the pipe mold. When the cast pipe is pulled out of the pipe mold, it will further damage the internal surfaces of the pipe mold. Not only does this cracking cause the pipe mold to wear out, but also a pipe made with a cracked mold will have defects on its outer wall.

The pipe mold failures described above result in considerable expense to pipe manufacturers because such pipe molds must be frequently repaired or replaced.

SUMMARY OF THE INVENTION

The present invention provides pipe molds which can be made to a desired dimension without the size limitation of forging equipment and without the metallurgical notches of pipe molds formed from flat plates and the resultant cracking caused from the metallurgical notches. In addition, the need for furnace heat treatment required with forged pipe molds is eliminated. Also, pipe molds can be produced with a uniform hardness through the weld material of the pipe mold.

Broadly, the pipe mold of this invention comprises a cylindrical wall defining a bore, the cylindrical wall having an inner surface facing the bore and an outer surface, wherein at least the inner surface of the cylindrical wall comprises weld material for presenting a uniform surface for casting. The pipe mold is made by depositing weld material on at least one surface of a rigid shell, the rigid shell made from a formed and welded flat plate. Shells can be circumferentially welded to form a shell of a desired length. When the weld material is deposited only on the outside of the shell, the shell is machined away resulting in a pipe mold whose total wall thickness comprises weld material. Weld material can also be deposited only on the inside diameter or bore of the shell. Alternatively, the weld material can be deposited on both the inside and outside diameters of the shell. In all cases, a uniform surface for casting is presented on the inside of the pipe mold and any weakness or metallurgical notches caused by the welds in the shell are eliminated. In the case where weld material is deposited on the inner and outer surfaces of the shell, the shell acts as a metallurgical seal to stop propagation of cracks originating at the bore from extending to the outside layer of the pipe mold. Weld material is deposited using the strip weld overlay technique with process-controlled thermal cycles during weld deposition.

DETAILED DESCRIPTION OF THE INVENTION

Figure 1:
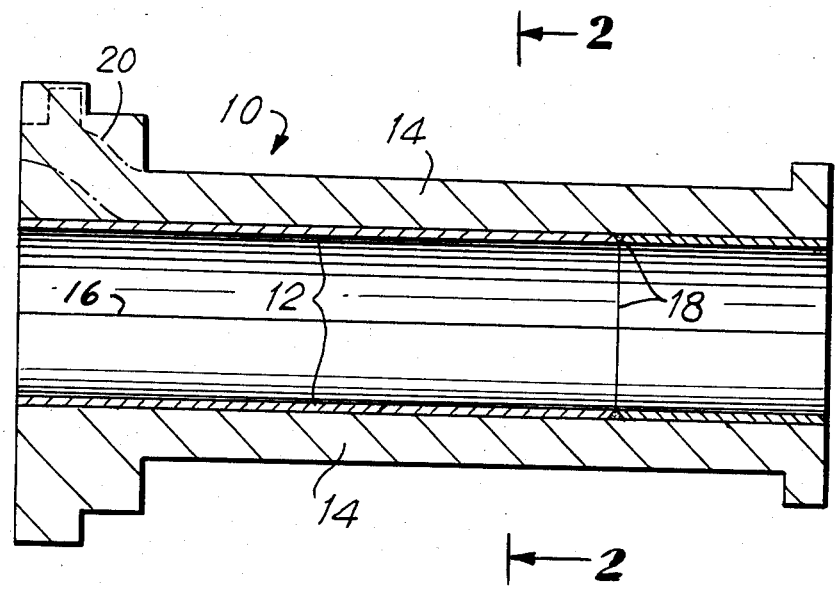
FIG. 1 is a side sectional view of a first embodiment of the invention.

Referring to FIG. 1, a pipe mold 10 according to the first embodiment of the invention is shown. A rolled plate of steel serves as a base or shell 12 which provides a rigid support for a layer of weld material 14. The shell 12 is machined away after the layer of weld material 14 is deposited and is not part of the final pipe mold 10. The shell can be made from any material that would provide a rigid support and help develop a form to the weld material. Generally, the shell is made from rolled plain carbon or alloy steel plate. The plate is formed into a cylinder defining a bore and welded along a seam 16. A shell of a desired length can be obtained by circumferentially butt-welding additional cylinders together end to end. Such a circumferential butt-weld is shown at 18 in FIG. 1.

Figure 2:
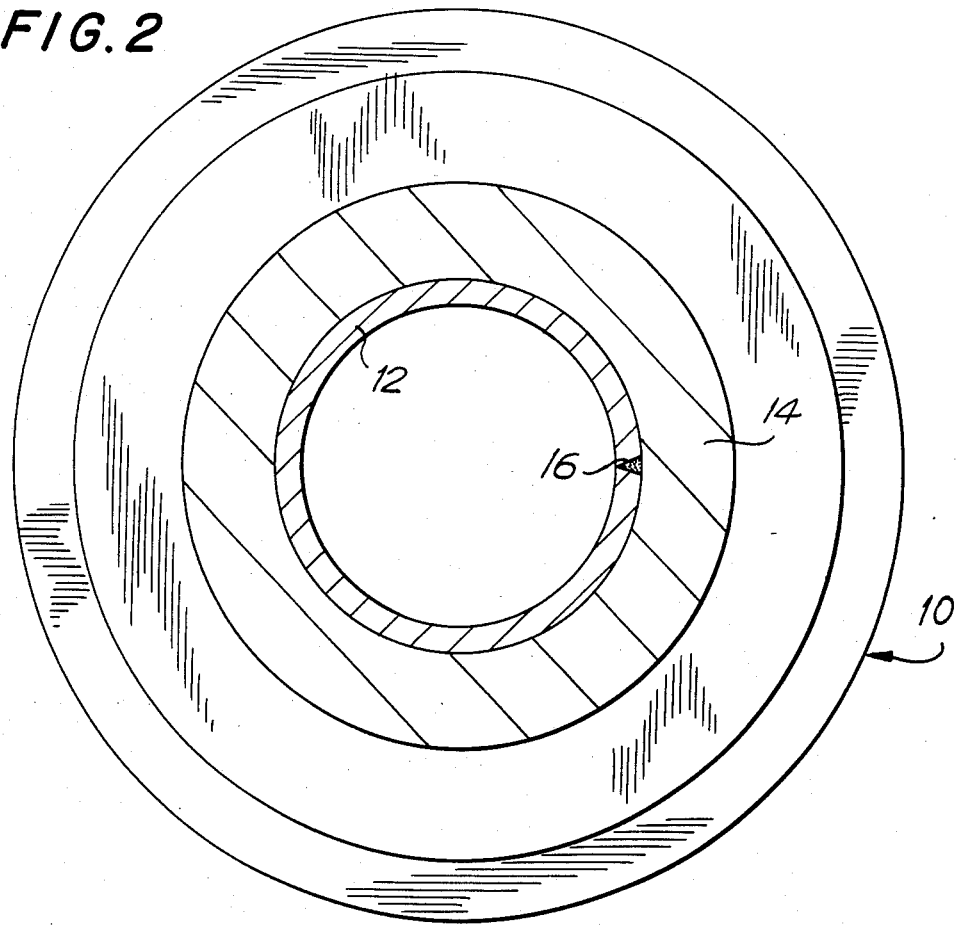
FIG. 2 is a view taken along line 2—2 of FIG. 1.

The thickness of the rolled plate can vary from ⅛ to 3 inches (3 to 76 mm.) or more. The particular thickness chosen will depend upon the size of the pipe mold being produced, rate and amount of weld deposit, and machining system available. In the first embodiment (FIGS. 1 and 2), for example, the shell 12 is relatively thin because that shell is machined away after the weld material has been deposited. The resultant pipe mold has a total wall thickness comprising weld material and no metallurgical notches. The outside wall of the pipe mold can also be machined to form a desired shape, such as a bell end as shown by dashed lines 20 in FIG. 1.

The weld deposit material can be, but is not limited to, either plain carbon steel or any alloy bearing material. The exact chemistry of the weld material will vary according to the use to which the pipe mold will be applied. The thickness of the weld deposit will depend upon the desired final thickness of the pipe mold and the amount of stock necessary to guarantee proper clean-up during finish machining.

Any welding technique can be used to deposit the layer of weld material on the rigid shell. However, it has been found that the use of a high deposition rate is important for the economic manufacture of pipe molds according to the present invention because of the large amounts of weld material needed to build up the required thickness on the rigid shell. The use of strip weld overlay has enabled significantly higher deposition rates of weld material than other welding techniques. (For a description of the strip weld overlay technique, see, for example, *Metals Handbook*, Volume 6, "Welding, Brazing, and Soldering," at pages 810-11, American Society for Metals, Metals Park, Ohio 44073 (9th Edition, 1983).)

The need for furnace heat-treatment of the weld deposited material can be eliminated by using process-controlled thermal cycles during weld deposition. Not only can "as heat-treated" mechanical properties be achieved in the "as weld deposited" material, but a uniform hardness level can be achieved through the cross-sectional thickness of the weld material of the pipe mold, even when using "low depth of hardening" grades of steel.

Figure 3:
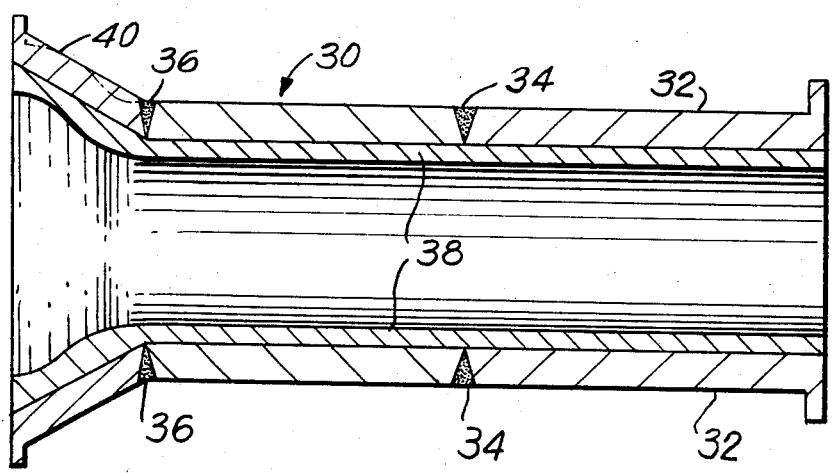
FIG. 3 is a side sectional view of a second embodiment of the invention.

FIG. 3 shows a pipe mold 30 of a second embodiment of the invention. A shell 32 is made from a thick rolled plate which is formed into a cylinder defining a bore and welded along the resulting seam. If desired, several cylinders can be circumferentially butt-welded, as shown at 34, to obtain a desired length. In addition, a bell form can be butt-welded onto one end of the shell, as shown at 36. A layer of weld deposit 38 about ¾ to 1 inch (19 to 25 mm.) thick is deposited on the bore of the shell 32. The layer of weld material has a uniform surface for casting and eliminates all metallurgical notches. Neither the outer shell 32 nor the weld deposit 38 is completely machined out during finish machining. The outer shell 32 can be machined to form the bell end as indicated by dashed lines 40.

Figure 4:
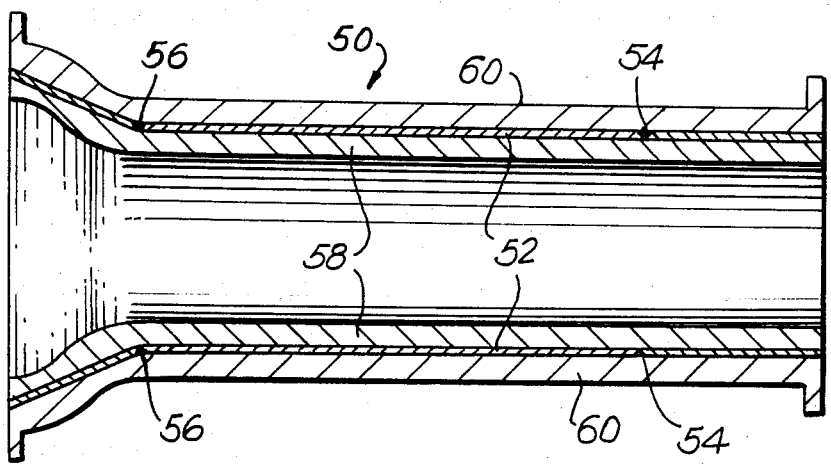
FIG. 4 is a side sectional view of a third embodiment of the invention.

FIG. 4 illustrates a pipe mold 50 of a third embodiment of the invention. A shell 52 is made from a thin rolled plate which is formed into a cylinder defining a bore and welded along the resulting seam. As before, additional cylinders can be circumferentially butt-welded together, as shown at 54, and a bell form can be butt-welded onto one end of the shell as shown at 56. An inside layer of weld material 58 as well as an outside layer of weld material 60 are deposited on the shell. The inside weld layer 58 eliminates the metallurgical notches which were present in the shell and provides a wear surface which can be repaired to prolong the life of the pipe mold. The outside weld layer 60 produces compressive stresses which minimize the propagation of cracks originating at the bore during service. In addition to acting as a support for weld layers 58 and 60, the shell 52 acts as a metallurgical seal to stop cracks propagating from the bore from spreading to the outside weld layer 60.

The chemistry of the weld deposit on the inside and outside diameters of the shell can be the same or different. For example, the outside layer 60 could be plain carbon steel and the inside layer 58 alloy steel.

It is to be understood that while the invention has been described with respect to the preferred embodiments, variations and equivalents thereof may be perceived by those skilled in the art while nevertheless not departing from the scope of my invention as set forth in the claims appended hereto.

I claim:

1. A pipe mold for centrifugally casting pipe, the pipe mold comprising:
   a plurality of rigid cylindrical shells welded together circumferentially defining a bore, with each of the rigid cylindrical shells being made from a formed and welded flat plate and having an inner and outer surface; and
   a first cylindrical member disposed on the inner surfaces of the plurality of rigid cylindrical shells defining a bore, with the cylindrical member being of weld deposited material and presenting a uniform surface for casting.

2. A pipe mold as claimed in claim 1 wherein said plurality of rigid cylindrical shells having said first cylindrical member disposed from the inner surfaces of said plurality rigid cylindrical shells further has disposed on the outer surfaces of said plurality of rigid cylindrical shells a second cylindrical member of weld deposited material.

3. A pipe mold as claimed in claim 2 wherein the weld deposited material comprising said second cylindrical member has a different chemical composition from the weld deposited material comprising said first cylindrical member.

4. A pipe mold as claimed in claim 2 wherein the weld deposited material comprising said second cylindrical member has the same chemical composition as the weld deposited material comprising said first cylindrical member.

5. A pipe mold as claimed in claim 2 wherein said first and second cylindrical members of weld deposited material have the same thickness.

6. A pipe mold as claimed in claim 2 wherein said first and second cylindrical member of weld deposited material have different thicknesses.

7. A process for making pipe molds for centrifugally casting pipes, the process comprising depositing weld deposited material on at least one surface of a plurality of rigid cylindrical shells welded together circumferentially with each rigid cylindrical shell having an inner surface and an outer surface, the deposited material presenting a uniform surface for pipe casting, and forming each rigid cylindrical shell from a formed and welded flat plate.

8. A process as claimed in claim 7 wherein the process further comprises the steps of depositing weld deposited material on the outer surfaces of said plurality of rigid cylindrical shells and machining away said plurality of rigid cylindrical shells after depositing the weld deposited material thereon.

9. A process as claimed in claim 7 wherein the depositing step further comprises depositing weld deposited material on the inner surfaces of the plurality of rigid cylindrical shells.

10. A process as claimed in claim 9 wherein the process further comprises the step of partially machining away the outer surfaces of said plurality of rigid cylindrical shells and the inner surface of the weld deposited material.

11. A process as claimed in claim 7 wherein the depositing step further comprises depositing weld deposited material on both the outer and inner surfaces of the plurality of rigid cylindrical shells.

12. A process for making pipe molds for centrifugally casting pipes, the process comprising the steps of:
(a) forming each of a plurality of flat rigid plates, with each plate having two side edges and two end edges, into a rigid cylindrical shell defining a bore by bringing the two side edges together, with each rigid cylindrical shell having an inner surface facing the bore and an outside surface;
(b) welding the two side edges of each cylindrical shell together along a seam, the seam resulting in a metallurgical notch;
(c) welding a plurality of rigid cylindrical shells together at their end edges forming a circumferential weld, with the circumferential weld resulting in an additional metallurgical notch; and
(d) depositing weld deposited material on at least the inner or outer surfaces of the plurality of rigid cylindircal shells to produce a pipe mold without any metallurgical notches.

13. A process as claimed in claim 12 wherein the process further comprises the steps of depositing the weld deposited material on the outer surfaces of the plurality of rigid cylindrical shells and machining away the plurality of rigid cylindrical shells after step (d).

14. A process as claimed in claim 12 wherein the depositing step further comprises depositing the weld deposited material on the inner surfaces of the plurality of rigid cylindrical shells.

15. A process as claimed in claim 12 wherein the depositing step further comprises the step of depositing the weld deposited material on both the outer and inner surfaces of the plurality of rigid cylindrical shells with the plurality of rigid cylindrical shells acting as metallurgical seals to stop cracks propagating from the bore from extending to the outer surfaces of the plurality of rigid cylindrical shells.

16. A process as claimed in claim 12 wherein the depositing step includes depositing weld deposited material using strip weld overlay.

17. A process as claimed in claim 12 wherein process-controlled thermal cycles are used during weld deposition to eliminate the need for furnace heat-treatment and to produce a uniform hardness through the weld deposited material of the pipe mold.

18. A pipe mold for centrifugally casting pipe, the pipe mold comprising:
a rigid cylindrical shell made from a formed and welded flat plate with said weld resulting in a metallurgical notch, said rigid cylindrical shell defining a bore and having an outer and inner surface; and
a first cylindrical member disposed on the inner surface of said rigid cylindrical shell, with the first cylindrical member being of weld deposited material and presenting a uniform surface for casting.

19. A process for making pipe molds for centrifugally casting pipes, the process comprising the steps of:
forming a rigid cylindrical shell by forming and welding a flat plate with said weld resulting in a metallurgical notch; and
depositing weld deposited material on at least an outer or inner surface of said rigid cylindrical shell for forming a casting surface to function without a metallurgical notch.

20. A process as claimed in claim 19 wherein the depositing step comprises depositing weld deposited material on the inner surface of said rigid cylindrical shell.

21. A process as claimed in claim 20 wherein the process further comprises the step of partially machining away an inner surface of said weld deposited material and an outer surface of said rigid cylindrical shell.

22. A process as claimed in claim 19 wherein the depositing step comprises depositing weld deposited material on an outer surface of said rigid cylindrical shell.

23. A process as recited in claim 22 wherein the process further comprises the step of machining away the rigid cylindrical shell after the depositing step.

24. A process for making pipe molds for centrifugally casting pipes, the process comprising the steps of:
(a) forming a flat rigid plate having two side edges and two end edges into a rigid cylindrical shell defining a bore by bringing the two side edges together, the cylindrical shell having an inner surface facing the bore and an outer surface;
(b) welding the two side edges along a seam, the seam resulting in a metallurgical notch;
(c) depositing weld deposited material on at least the inner or outer surface of the rigid cylindrical shell to produce a pipe mold to function without any metallurgical notches.

25. A process as claimed in claim 24 wherein the depositing step comprises depositing the weld deposited material on the outer surface of the rigid cylindrical shell.

26. A process as claimed in claim 25 wherein the process further comprises the step of machining away the rigid cylindrical shell after the depositing step.

27. A process as claimed in claim 24 wherein the depositing step comprises depositing the weld deposited material on the inner surface of said rigid cylindrical shell.

28. A process as recited in claim 27 wherein the process further comprises the step of partially machining away the outside surface of the rigid cylindrical shell and an inner surface of the weld deposited material.

29. A process as claimed in claim 24 wherein the depositing step includes depositing weld deposited material using strip weld overlay.

30. A process as claimed in claim 24 wherein process-controlled thermal cycles are used during weld deposition to eliminate the need for furnace heat-treatment and to produce a uniform hardness through the weld deposited material of the pipe mold.

31. A pipe mold for centrifugally casting pipe, the pipe mold comprising:
a rigid cylindrical shell having an inner and outer surface;
a first cylindrical member of weld deposited material deposited on said inner surface of said rigid cylindrical shell; and
a second cylindrical member of weld deposited material disposed on said outer surface of said rigid cylindrical shell.

32. A pipe mold as claimed in claim 31 wherein the rigid cylindrical shell comprises a formed and welded flat plate.

33. A pipe mold as claimed in claim 31 wherein the weld deposited material comprising said second cylindrical member has a different chemical composition than the weld deposited material comprising the first cylindrical member.

34. A pipe mold as claimed in claim 31 wherein the weld deposited material comprising said second cylindrical member has the same chemical composition as the weld deposited material comprising said first cylindrical member.

35. A pipe mold as claimed in claim 31 wherein the first and second cylindrical members of weld deposited material have the same thickness.

36. A pipe mold as claimed in claim 31 wherein the first and second cylindrical members of weld deposited material have different thicknesses.

37. A process for making pipe molds for centrifugally casting pipes, the process comprising the steps of:
    forming a rigid cylindrical shell from a formed and welded flat plate;
    depositing weld deposited material on an inner surface of said rigid cylindrical shell; and
    depositing weld deposited material on an outer surface of said rigid cylindrical shell.

38. A process for making pipe mold for centrifugally casting pipes, the process comprising the steps of:
    forming a rigid cylindrical shell from a flat plate having two side edges and two end edges with said shell defining a bore by bringing the two side edges together, the rigid cylindrical shell having an inner surface facing the bore and an outer surface;
    welding the two side edges along a seam, the seam resulting in a metallurgical notch;
    depositing weld deposited material on both the inner and outer surfaces of the rigid cylindrical shell and the rigid cylindrical shell acts as a metallurgical seal to stop cracks from propagating from the bore from extending to the outer surface of the rigid cylindrical shell.

39. A process as claimed in claim 38 wherein process-controlled thermal cycles are used during weld deposition to eliminate the need for furnace heat-treatment and to produce a uniform hardness through the weld deposited material of the pipe mold.

40. A process as claimed in claim 38 wherein the depositing step includes depositing weld deposited material using strip weld overlay.

* * * * *

UNITED STATES PATENT AND TRADEMARK OFFICE
CERTIFICATE OF CORRECTION

PATENT NO. : 4,601,322

DATED : July 22, 1986

INVENTOR(S) : Ashok Khare

It is certified that error appears in the above-identified patent and that said Letters Patent is hereby corrected as shown below:

Cover Page, References Cited: U.S. Patent Documents,
after "4,242,981
1/1981 Bernard et al. .........
219/76.1", insert -- 4,253,006
2/1981 Ludwig .......... 219/76.1 --

Claim 12, column 5, line 24, change
"cylindircal" to -- cylindrical --

Signed and Sealed this

Twenty-fifth Day of August, 1987

Attest:

DONALD J. QUIGG

Attesting Officer    Commissioner of Patents and Trademarks